(12) United States Patent
Bury

(10) Patent No.: US 7,734,261 B2
(45) Date of Patent: Jun. 8, 2010

(54) CALIBRATING AMPLITUDE AND PHASE IMBALANCE AND DC OFFSET OF AN ANALOG I/Q MODULATOR IN A HIGH-FREQUENCY TRANSMITTER

(75) Inventor: Andreas Bury, Dresden (DE)

(73) Assignee: NXP B.V., Eindhoven (NL)

( * ) Notice: Subject to any disclaimer, the term of this patent is extended or adjusted under 35 U.S.C. 154(b) by 521 days.

(21) Appl. No.: 11/722,084

(22) PCT Filed: Dec. 9, 2005

(86) PCT No.: PCT/IB2005/054157

§ 371 (c)(1),
(2), (4) Date: Jun. 18, 2007

(87) PCT Pub. No.: WO2006/064435

PCT Pub. Date: Jun. 22, 2006

(65) Prior Publication Data

US 2009/0270053 A1 Oct. 29, 2009

(30) Foreign Application Priority Data

Dec. 16, 2004 (EP) .................................. 04106643

(51) Int. Cl.
*H03C 1/62* (2006.01)

(52) U.S. Cl. .................. 455/115.1; 455/67.14; 455/102

(58) Field of Classification Search ................ 455/115.1

See application file for complete search history.

(56) References Cited

U.S. PATENT DOCUMENTS 6,393,258 B1 * 5/2002 Gambina et al. ......... 455/67.14

(Continued)

FOREIGN PATENT DOCUMENTS

JP 5-136836 A 6/1993

(Continued)

OTHER PUBLICATIONS

Yang, G; et al "I/Q Modulator Image Rejection Through Modulation Pre-Distortion" Vehicular Technology for the Human Race. IEEE. vol. 2, Apr. 28, 1996, pp. 1317-1320.

(Continued)

*Primary Examiner*—Duc Nguyen
*Assistant Examiner*—Ajibola Akinyemi

(57) ABSTRACT

The object of the invention, which relates to a method and an arrangement for calibrating an analog I/Q modulator in a high-frequency transmitter, is to provide a method and an associated circuit arrangement by means of which a calibration of the I/Q modulator is carried out without a balancing operation and thus the complexity is minimized. According to the invention, this object is achieved, in terms of the method, in that transmission signals are produced by the I/Q modulator in three method steps in accordance with the method and said transmission signals are in each case evaluated and the results of the evaluations are stored, in that, in a fourth method step, improved compensation coefficients are calculated on the basis of the results of the previous evaluations, which improved compensation coefficients can be used for a subsequent run-through of the method, and in that the run-throughs of the method are repeated until the error of the amplitude and/or phase response of the I/Q modulator lies below a defined threshold value or a defined number of run-throughs of the method is reached.

9 Claims, 2 Drawing Sheets

U.S. PATENT DOCUMENTS

| | | | |
|---|---|---|---|
| 6,704,551 B2 * | 3/2004 | Riou et al. | ............... 455/115.1 |
| 2003/0095607 A1 | 5/2003 | Huang et al. | |
| 2004/0162038 A1 | 8/2004 | Kanazawa | |

FOREIGN PATENT DOCUMENTS

| | | |
|---|---|---|
| JP | 2000-124964 A | 4/2000 |
| JP | 2000-244596 A | 9/2000 |
| JP | 2001-44762 A | 2/2001 |
| JP | 2003-249822 A | 5/2003 |
| JP | 2004-15310 A | 1/2004 |
| WO | 2004/095686 A1 | 11/2004 |
| WO | 2004/095686 A3 | 11/2004 |

OTHER PUBLICATIONS

Cavers, James K. "New Methods for Adaptation of Quadrature Modulators and Demodulators in Amplifier Linearization Circuits" IEEE Transactions on Vehicular Technology, vol. 46, No. 3, Aug. 1997, pp. 707-716.

* cited by examiner

CALIBRATING AMPLITUDE AND PHASE IMBALANCE AND DC OFFSET OF AN ANALOG I/Q MODULATOR IN A HIGH-FREQUENCY TRANSMITTER

The invention relates to a method of calibrating an analog I/Q modulator in a high-frequency transmitter, in which an input signal is weighted in an in-phase path and in a quadrature phase path by respectively a first and a second compensation coefficient prior to the I/Q modulation, and an output signal is produced.

The invention also relates to an arrangement for calibrating an analog I/Q modulator in a high-frequency transmitter, with a compensation arrangement connected upstream thereof for correcting the amplitude and phase imbalance of the I/Q modulator.

In communication engineering, in order to transmit information via radio, use is made inter alia of transmitters which make use of an analog I/Q modulator to produce transmission signals.

Typically, specific requirements are placed on such transmitters in terms of the modulation accuracy and in terms of the carrier and sideband suppression of the I/Q modulator. Here, the problem arises that the amplification in the in-phase path has to coincide to a sufficiently accurate extent with the amplification in the quadrature phase path. Likewise, the phase position of the oscillator signals for I and Q must be phase-shifted in a sufficiently accurate manner by 90 degrees and the DC voltage component at the input of the I/Q modulator must be balanced.

In James K. Cavers: New Methods for Adaptation of Quadrature Modulators and Demodulators in Amplifier Linearization Circuits, IEEE Trans. Vehic. Tech. Vol. 46, No. 3, August 1997, a description is given of a method for calibrating an I/Q modulator, which method is based on evaluating an envelope curve at the output of the I/Q modulator by means of a level indicator. Test signals of varying amplitude are transmitted in order to estimate the transmission characteristic of the level indicator.

The described method is sensitive with regard to the delay between the input signal of the I/Q modulator and the output signal of the level indicator. This delay must therefore be estimated separately.

U.S. Pat. No. 6,704,551 describes a method of calibrating an I/Q modulator in which a first calibration signal is fed into the in-phase path of the I/Q modulator and a second calibration signal is fed into the quadrature phase path of the I/Q modulator. The two calibration signals are fed in prior to the conversion which occurs in the I/Q modulator. The signal produced in this way is then detected and a digitalization of this signal is carried out and thus a respective first and second digital signal are produced. The calibration of the in-phase path and of the quadrature phase path of the I/Q modulator takes place, with alternate determination and changing of the two calibration signals, until the lowest possible variation of the respective most significant bit of the first and second digitalized signal is achieved. During this operation, the most significant bits of the calibration bit values, which correspond to the minimum value of the digitalized signal, are stored.

US 2003/0095607 describes a method for the self-calibration of an I/Q modulator, in which a determination of the pre-distortion coefficients takes place as a function of an in-phase signal, a quadrature signal and an output envelope curve of an RF signal. In this method, a representative value of an output envelope curve which lies in a nonlinear domain is transformed into a value of the output envelope curve which lies in a linear domain. There is then a determination of the variables of a vector x as a solution for the linear equation within the linear domain of the curve and a determination of the pre-distortion coefficients from the vector x.

The disadvantages of the known methods are therefore that the time delay and the transmission behavior of the detector have to be known and an increased calculation complexity is required in order to determine the calibration values.

It is thus an object of the invention to provide a method and an associated circuit arrangement for calibrating an analog I/Q modulator in a high-frequency transmitter, by means of which a calibration of the I/Q modulator is carried out without a balancing operation and thus the complexity is minimized.

According to the invention, in a method of calibrating an analog I/Q modulator in a high-frequency transmitter of the abovementioned type, this object is achieved in that, in a first method step, the first compensation coefficients $C_I$, $C_Q$, which affect the sideband suppression of the output signal, and the second compensation coefficients $D_I$, $D_Q$, which affect the carrier suppression of the output signal, are in each case set to a first predefined value $C_{I,1}$, $C_{Q,1}$, $D_{I,1}$, and $D_{Q,1}$, in that the input of the I/Q modulator is supplied with an input signal which satisfies a rotating exponential function with the frequency $f_0$, a first I/Q modulator output signal is produced and fed to a first evaluation and the result of the first evaluation is stored, in that, in a second method step, the first and second compensation coefficients are in each case set to a second defined value $C_{I,2}$, $C_{Q,2}$, $D_{I,2}$ and $D_{Q,2}$ and a second I/Q modulator output signal is produced, fed to a second evaluation and the result of the second evaluation is stored, in that, in a third method step, the first and second compensation coefficients are in each case set to a third defined value $C_{I,3}$, $C_{Q,3}$, $D_{I,3}$ and $D_{Q,3}$ and a third I/Q modulator output signal is produced, fed to a third evaluation and the result of the third evaluation is stored, in that, in a fourth method step, improved compensation coefficients which reduce the amplitude and/or phase imbalance of the I/Q modulator and/or the amplitude of the residual carrier are calculated for the first and second compensation coefficients from the results stored in the first, second and third method step, and in that the first, second, third and fourth method step is repeated using these improved compensation coefficients until the error in the amplitude and/or phase response of the I/Q modulator lies below a defined threshold value or a defined number of run-throughs of the method is reached.

I/Q imbalance and carrier suppression are calibrated independently of one another. Both are based on the assumption of a linear model for the observed variable as a function of the manipulated variable:

$$\begin{bmatrix} v_I \\ v_Q \end{bmatrix} = \begin{bmatrix} A_{II} & A_{QI} \\ A_{IQ} & A_{QQ} \end{bmatrix} \cdot \left( \begin{bmatrix} u_I \\ u_Q \end{bmatrix} - \begin{bmatrix} \hat{u}_I \\ \hat{u}_Q \end{bmatrix} \right) \quad (1)$$

In vector/matrix notation, this equation reads as follows $$v = A \cdot (u - \hat{u}) \quad (2)$$

with the observed variable v, the imbalance u and the compensation value û, which in the ideal case corresponds to the imbalance u and thus compensates the latter. The transformation matrix A is unknown. In the case of perfect compensation, the observed variable v is zero. One or more adaptation steps may be carried out, wherein an adaptation step consists of three partial measurements. It is assumed here that there is a given compensation value $\hat{u}_1$ prior to the adaptation step, which value may for example be zero at the start of the method.

In one special embodiment, $v_1=A\cdot(u-\hat{u}_1)$ is observed in the first partial measurement. Before the second partial measurement is carried out, a second compensation value $\hat{u}_2$ is calculated in accordance with the formula $\hat{u}_2=\hat{u}_1+[\Delta u\ 0]^T$ and then $v_2=A\cdot(u-\hat{u}_2)$ is observed. Before the third partial measurement is carried out, a third compensation value $\hat{u}_3$ is calculated in accordance with the formula $\hat{u}_3=\hat{u}_1+[0\ \Delta u]^T$ and then $v_3=A\cdot(u-\hat{u}_3)$ is observed. Based on these three previous observations of the variable v, the coefficients of the transformation matrix are estimated in accordance with $B=\tilde{A}\cdot\Delta u=[(v_2-v_1)(v_3-v_1)]$ and an improved compensation value $\hat{u}_4$ is calculated in accordance with the formula $\hat{u}_4=\hat{u}_1-B^{-1}\cdot v_1\cdot\Delta u$ starting from the calculated coefficients of the transformation matrix. It is advantageous here to carry out a number of adaptation steps, possibly using successive, increasingly smaller values $\Delta u$, in order to reduce to a minimum both the amplitude and phase response errors of the I/Q modulator.

If the observation does not contain any estimate errors, $\hat{u}_4$ corresponds exactly to the imbalance u to be estimated.

The number of adaptation steps is determined for example by the magnitude of the error in the amplitude and/or phase response of the I/Q modulator. If this is below a defined threshold value or if a defined number of method run-throughs has been reached, calibration is terminated.

In one embodiment of the invention, it is provided that the first compensation coefficients $C_I$, $C_Q$ or the second compensation coefficients $D_I$, $D_Q$ have the same value for the first, second and third method step.

The method according to the invention may be carried out in a number of repetitions of method steps one to four. The values defined in or before the first method step for the first and second compensation coefficients $C_I$, $C_Q$, $D_I$, $D_Q$ may assume the value zero or some other freely selectable value. In a second and/or third method step, these values are replaced by other freely selectable values or retain their old values.

For example, in order to determine the calibration values for sideband suppression $C_I$ and $C_Q$, the second compensation coefficients $D_I$ and $D_Q$ may retain the same defined values for the first, second and third method step whereas the values of the first compensation coefficients $C_I$ and $C_Q$ change in each method step. The pair of values $(C_{I,1}, C_{Q,1})$ is set in the first method step, the pair of values $(C_{I,2}, C_{Q,2})$ is set in the second method step and the pair of values $(C_{I,3}, C_{Q,3})$ is set in the third method step.

In an analogous manner, in order to determine the calibration values for carrier suppression $D_I$ and $D_Q$, the first compensation coefficients $C_I$ and $C_Q$ may retain the same defined values for the first, second and third method step whereas the values of the second compensation coefficients $D_I$ and $D_Q$ change in each method step. The pairs of values $(D_{I,1}, D_{Q,1})$, $(D_{I,2}, D_{Q,2})$ and $(D_{I,3}, D_{Q,3})$ are thus used in the first, second and third method step.

The order of determining the calibration values for sideband suppression $C_I$ and $C_Q$ and determining the calibration values for carrier suppression $D_I$ and $D_Q$ may be selected at will.

For example, the determination of the calibration values for sideband suppression may take place in a first run-through of the method and the determination of the calibration values for carrier suppression may take place in a subsequent second run-through of the method, or vice versa. These run-throughs may also be repeated.

Another calibration procedure may consist of a repeated successive determination of the calibration values for sideband suppression or carrier suppression with a subsequent single or repeated determination of the calibration values for carrier suppression or sideband suppression.

Another variant consists for example in determining the calibration values for sideband suppression and carrier suppression within one run-through of the method.

In one special embodiment of the invention, it is provided that, for the first method step, the first compensation coefficients $C_I$, $C_Q$ and/or the second compensation coefficients $D_I$, $D_Q$ are set to compensation coefficients determined in a previous run-through of the method.

Each run-through of the method, consisting of the first, second, third and fourth method steps, determines improved or optimized compensation coefficients for the first and/or second compensation coefficients. These may be used in full or in part for a subsequent method step or run-through of the method. These improved compensation coefficients are then the defined value to which the compensation coefficients $C_I$, $C_Q$, $D_I$, $D_Q$ are set at the start of the first, second or third method step.

In one embodiment of the invention, it is provided that at least one of the compensation coefficients $C_I$, $C_Q$, $D_I$, $D_Q$ is acted upon by a change value $\Delta C$ and/or $\Delta D$ prior to a subsequent method step.

According to the invention, in the first method step, the first and/or second compensation coefficients may be set to a defined value or to an optimal value determined in a previous run-through of the method. The first method step will be carried out using these starting values $C_I$, $C_Q$, $D_I$, $D_Q$. At the start of the second method step, the values for the compensation coefficients may be partially retained or completely changed. Here, a change in a compensation value may consist, besides the value being replaced by a different value, also in a value being acted upon by a change value $\Delta C$ and/or $\Delta D$. For example, a pair of compensation values $(C_{I,1}, C_{Q,1})$ from the first method step may be formed in accordance with $(C_{I,2}=C_{I,1}, C_{Q2}=C_{Q1}+\Delta C)$ for a second method step. It is possible for a value to be acted upon by a change value $\Delta C$ or $\Delta D$ in the case of one or more of the compensation coefficients $C_I$ and/or $C_Q$ and/or $D_I$ and/or $D_Q$.

In a further embodiment of the invention, it is provided that the input signal fed in at the input of the I/Q modulator, which satisfies a rotating exponential function with the frequency $f_0$, is produced from a partial function $s_I(t)=A_0^*\cos(2\pi f_0 t+\phi_0)$ for the in-phase input and a partial function $s_Q(t)=A_0^*\sin(2\pi f_0 t+\phi_0)$ for the quadrature phase input.

An input signal which corresponds to a rotating exponential function may be produced by feeding in a sine signal and a cosine signal at the corresponding inputs. If this rotating exponential function is transmitted with the frequency $f_0$, $s(t)=s_I(t)+j\cdot s_Q(t)=A_0\cdot\exp(j2\pi f_0 t+\phi_0)$, where $f_0\ll f_C$, in the event of perfect balancing a constant voltage $p(t)=K_0$ appears at the output of the power detector. An imbalanced DC voltage component $E\neq D$ then gives rise, at the output of the power detector, to an approximately sinusoidal oscillation with the frequency $f_0$, $p(t)=K_I+L_I\sin(2\pi f_0 t+\phi_I)$.

Amplitude $L_I$ and phase $\phi_I$ of this sinusoidal oscillation contain information about the imbalance of the DC voltage component in the I and Q direction, but the effect of the imbalance is a priori not known.

In one particular embodiment of the invention, it is provided that the I/Q modulator output signal is subjected to power detection and thus a level indicator output signal p(t) is produced, in that the first evaluation takes place in accordance with $$v_{I,1} := \int_0^{NT_0} p_1(t) \cdot w_I(t) \cdot dt \text{ and } v_{Q,1} := \int_0^{NT_0} p_1(t) \cdot w_Q(t) \cdot dt,$$

wherein, in order to determine improved first compensation coefficients $C_I$ and $C_Q$, $w_I(t)=\cos(4\pi f_0 t)$ and $w_Q(t)=\sin(4\pi f_0 t)$, in that the second evaluation takes place in accordance with $$v_{I,2} := \int_0^{NT_0} p_2(t) \cdot w_I(t) \cdot dt \text{ and } v_{Q,2} := \int_0^{NT_0} p_2(t) \cdot w_Q(t) \cdot dt,$$

in that the third evaluation takes place in accordance with $$v_{I,3} := \int_0^{NT_0} p_3(t) \cdot w_I(t) \cdot dt \text{ and } v_{Q,3} := \int_0^{NT_0} p_3(t) \cdot w_Q(t) \cdot dt,$$

in that the determination of the improved first compensation coefficients $C_I$ and $C_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $C_I=(C_{I,1}\cdot z_1+C_{I,2}\cdot z_2+C_{I,3}\cdot z_3)\cdot R$ and $C_Q=(C_{Q,1}\cdot z_1+C_{Q,2}\cdot z_2+C_{Q,3}\cdot z_3)\cdot R$ or the determination of the improved second compensation coefficients $D_I$ and $D_Q$, wherein $w_I(t)=\cos(2\pi f_0 t)$ and $w_Q(t)=\sin(2\pi f_0 t)$, is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $D_I=(D_{I,1}\cdot z_1+D_{I,2}\cdot z_2+D_{I,3}\cdot z_3)\cdot R$ and $D_Q=(D_{Q,1}\cdot z_1+D_{Q,2}\cdot z_2+D_{Q,3}\cdot z_3)\cdot R$.

In one embodiment of the invention, it is provided that the I/Q modulator output signal is subjected to an I/Q demodulation and thus a complex baseband received signal $r(t)=r_I(t)+j\cdot r_Q(t)$ is produced, in that the first evaluation takes place in accordance with $$v_{I,1} := \int_0^{NT_0} r_{I,1}(t) \cdot dt \text{ and } v_{Q,1} := \int_0^{NT_0} r_{Q,1}(t) \cdot dt,$$

in that the second evaluation takes place in accordance with $$v_{I,2} := \int_0^{NT_0} r_{I,2}(t) \cdot dt \text{ and } v_{Q,2} := \int_0^{NT_0} r_{Q,2}(t) \cdot dt,$$

in that the third evaluation takes place in accordance with $$v_{I,3} := \int_0^{NT_0} r_{I,3}(t) \cdot dt \text{ and } v_{Q,3} := \int_0^{NT_0} r_{Q,3}(t) \cdot dt,$$

in that the determination of the improved second compensation coefficients $D_I$ and $D_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $D_I=(D_{I,1}\cdot z_1+D_{I,2}\cdot z_2+D_{I,3}\cdot z_3)\cdot R$ and $D_Q=(D_{Q,1}\cdot z_1+D_{Q,2}\cdot z_2+D_{Q,3}\cdot z_3)\cdot R$ or the first evaluation takes place in accordance with $$v_{I,1} := \int_0^{NT_0} r_{I,1}(t)\cdot w_I(t)+r_{Q1}(t)\cdot w_Q(t)\cdot dt$$

and $$v_{Q,1} := \int_0^{NT_0} r_{Q,1}(t)\cdot w_I(t) - r_{I1}(t)\cdot w_Q(t)\cdot dt,$$

in that the second evaluation takes place in accordance with $$v_{I,2} := \int_0^{NT_0} r_{I,2}(t)\cdot w_I(t)+r_{Q2}(t)\cdot w_Q(t)\cdot dt$$

and $$v_{Q,2} := \int_0^{NT_0} r_{Q,2}(t)\cdot w_I(t) - r_{I2}(t)\cdot w_Q(t)\cdot dt,$$

in that the third evaluation takes place in accordance with $$v_{I,3} := \int_0^{NT_0} r_{I,3}(t)\cdot w_I(t)+r_{Q3}(t)\cdot w_Q(t)\cdot dt$$

and $$v_{Q,3} := \int_0^{NT_0} r_{Q,3}(t)\cdot w_I(t) - r_{I3}(t)\cdot w_Q(t)\cdot dt,$$

in that the determination of the improved first compensation coefficients $C_I$ and $C_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $C_I=(C_{I,1}\cdot z_1+C_{I,2}\cdot z_2+C_{I,3}\cdot z_3)\cdot R$ and $C_Q=(C_{Q,1}\cdot z_1+C_{Q,2}\cdot z_2+C_{Q,3}\cdot z_3)\cdot R$.

In one advantageous embodiment of the invention, it is provided that the integrations used in the method take place in a time-discrete manner such that sampling of the function variation takes place with a subsequent summation.

In the case of a time-discrete realization, the above-described time-continuous signals are replaced by time-discrete signals and the integrals are replaced by sums.

In one embodiment of the invention, it is provided that the method takes place during start-up of the high-frequency transmitter, in a time-controlled manner, in the event of changing ambient conditions such as pressure and/or temperature or in the event of a change in operating mode of the high-frequency transmitter.

The method according to the invention may be used at various times during operation of the I/Q modulator. For example, it is advantageous to balance the I/Q modulator again directly after the device has been switched on or when the operating mode is changed. However, the method may also be carried out periodically or in the event of changing ambient conditions. Such ambient conditions may be for example pressure, temperature, air humidity or the presence of interference acting on the transmitter.

According to the invention, in an arrangement for calibrating an analog I/Q modulator in a high-frequency transmitter of the type mentioned in the introduction, the object is achieved in that a level indicator arrangement or an I/Q demodulator for evaluating the output signal produced by the I/Q modulator is connected downstream of the I/Q modulator.

The transmission signal produced by the I/Q modulator is evaluated by means of the method. This evaluation may be carried out for example by a level indicator. The latter evaluates the present power of the transmission signal of the I/Q modulator and supplies for example an output signal which depends in a strictly monotonous manner on the input signal, said output signal corresponding to a variable to be observed by virtue of the method. A further possibility consists in using a balanced I/Q demodulator which demodulates the transmission signal produced by the I/Q modulator and provides an output signal to be evaluated.

In one embodiment of the invention, it is provided that the level indicator arrangement consists of a series connection of an envelope curve detector and a low-pass filter.

In a further embodiment of the invention, it is provided that the series connection is followed by a stage with a nonlinear transmission behavior.

According to the invention, the level indicator arrangement consists of a level indicator with a strictly monotonous transmission behavior, a downstream low-pass filter and a further transmission stage with a nonlinear transmission characteristic which is optionally connected downstream.

In one particular embodiment of the invention, it is provided that the I/Q demodulator has a signal input connected to an input node, that the input node is connected to a multiplier for the in-phase path and to a multiplier for the quadrature phase path, that the two multipliers are each connected via a filter to the respective output of the I/Q demodulator arrangement and to a quadrature phase oscillator.

The I/Q demodulator used to demodulate the transmission signal produced by the I/Q modulator usually consists of an input node in which the complex received signal is split into the real part and the imaginary part. A multiplier is then contained in each case in the in-phase path and in the quadrature phase path, said multiplier being controlled by a signal of a quadrature phase oscillator connected to the multiplier. A low-pass filter is in each case arranged between each multiplier and the associated output.

The invention will be further described with reference to examples of embodiments shown in the drawings to which, however, the invention is not restricted.

The aim of the invention is to calibrate the analog I/Q modulator in a high-frequency transmitter such that a sufficiently high modulation accuracy and carrier suppression is achieved. The method does not require any balancing. This is achieved by special test signals and an associated evaluation. The method can operate with various sensors for evaluating the transmitted high-frequency signal; for the evaluation, use may be made both of a linear or nonlinear level indicator and of an I/Q demodulator. The level indicator in this case exhibits a strictly monotonous transmission characteristic between the input variable to be evaluated, for example a present power, and its output signal level.

Figure 1:
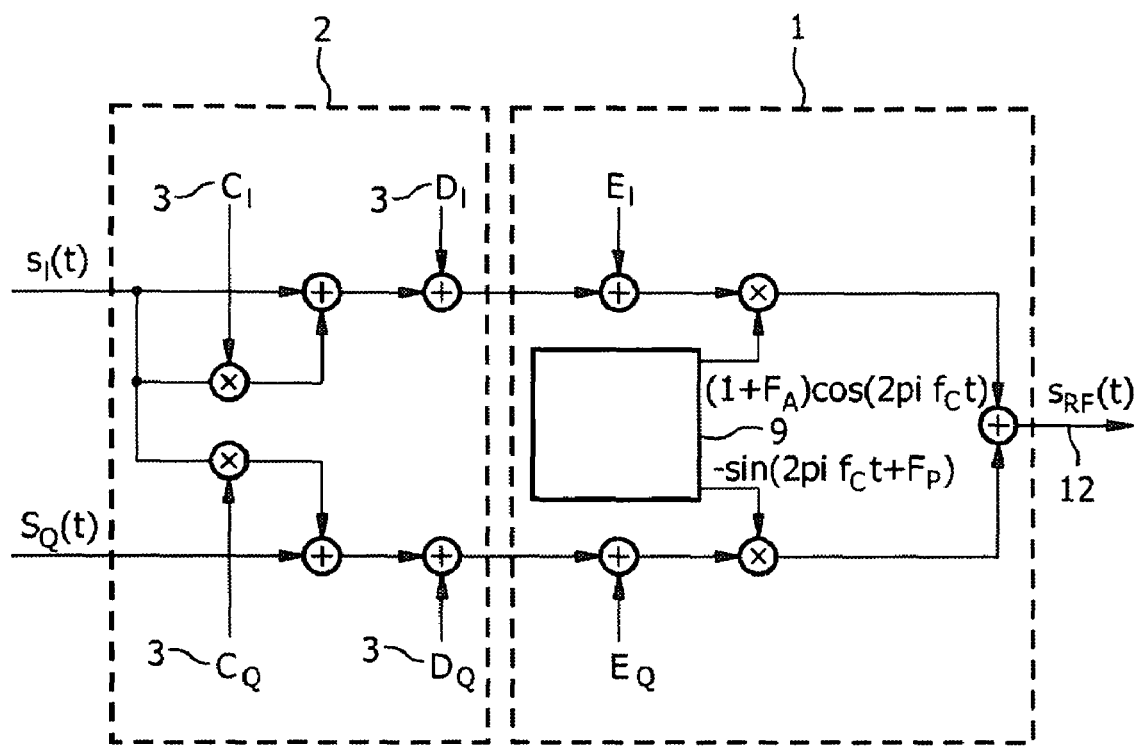
FIG. 1 shows an I/Q modulator with compensation circuit as part of a transmitter.
Figure 2:
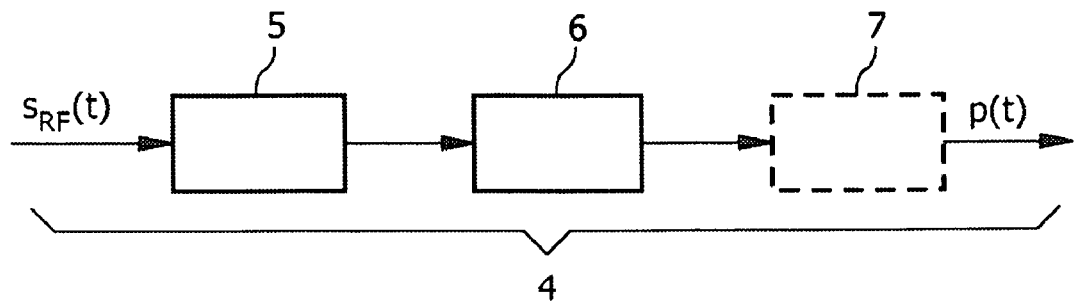
FIG. 2 shows a level indicator arrangement.

FIG. 1 shows an I/Q modulator 1 with compensation circuit 2 as part of a transmitter (not shown here).

The fact that the I/Q modulator 1 is not ideal is described by a DC offset $E_I$, $E_Q$, an amplitude mismatch $F_A$ and a phase mismatch $F_P$. Connected upstream of the I/Q modulator 1 is a compensation circuit 2, the compensation coefficients $C_I$, $C_Q$, $D_I$, $D_Q$ 3 of which in the ideal case are set such that the combination of compensation circuit 2 and non-ideal I/Q modulator 1 together behaves like an ideal I/Q modulator without imbalance. Here, the phase position of the high-frequency transmission signal $s_{RF}(t)$ is regarded as a permitted degree of freedom, that is to say it may be selected at will.

Two possibilities exist for the measured variable for determining the imbalance.

Firstly, the output signal p(t) of a level indicator arrangement 4, as shown in FIG. 1. The illustrated stage with a nonlinear transmission behavior 7 may be formed for example by a log/lin converter or by some other weakly linear characteristic which runs in a strictly monotonous manner. In the simplest case, this may even be omitted.

Secondly, the complex output signal $r_I(t)$, $r_Q(t)$ of a sufficiently accurately calibrated I/Q demodulator 1, which is described here as an ideal I/Q demodulator. The use of the estimating method according to the invention using special test signals makes it possible to determine the sought parameters without knowing other variables in the system, such as, for example:

DC offset of the level indicator transmission characteristic

Temperature-dependence of the level indicator transmission characteristic

Propagation time between transmission signal and signal on the level indicator

Phase rotation of the signal at the I/Q demodulator output

Propagation time between I/Q modulator and I/Q demodulator

In the case of a time-discrete realization, the time-continuous signals described below are replaced by time-discrete signals and integrals are replaced by sums.

I/Q imbalance and carrier suppression are in principle calibrated independently of one another. Both are based on the assumption of a linear model for the observed variable as a function of the manipulated variable:

$$\begin{bmatrix} v_I \\ v_Q \end{bmatrix} = \begin{bmatrix} A_{II} & A_{QI} \\ A_{IQ} & A_{QQ} \end{bmatrix} \cdot \left( \begin{bmatrix} u_I \\ u_Q \end{bmatrix} - \begin{bmatrix} \hat{u}_I \\ \hat{u}_Q \end{bmatrix} \right) \quad (1)$$

In vector/matrix notation, this equation reads as follows $$v = A \cdot (u - \hat{u}) \quad (2)$$

Here, v is the observed variable, u is the imbalance and û is the compensation value which in the ideal case corresponds to the imbalance. The transformation matrix A is unknown. In the case of perfect compensation, the observation v is zero. One or more adaptation steps may be carried out. One adaptation step consists of three partial measurements. It is assumed here that there is a given compensation value $\hat{u}_1$ prior to the adaptation step.

An adaptation step then consists of the following individual steps:

1) Observation of $v_1 = A \cdot (u - \hat{u}_1)$.

2) Calculation of a second compensation value $\hat{u}_2$ in accordance with the formula $\hat{u}_2 = \hat{u}_1 + [\Delta u \ 0]^T$ and observation of $v_2 = A \cdot (u - \hat{u}_2)$.

3) Calculation of a third compensation value $\hat{u}_3$ in accordance with the formula $\hat{u}_3 = \hat{u}_1 + [0 \ \Delta u]^T$ and observation of $v_3 = A \cdot (u - \hat{u}_3)$.

4) Estimate of the coefficients of the transformation matrix using $$B = \tilde{A} \cdot \Delta u = [(v_2 - v_1)(v_3 - v_1)]. \quad (3)$$

and calculation of an improved compensation value $\hat{u}_4$ in accordance with the formula $$\hat{u}_4 = \hat{u}_1 - B^{-1} \cdot v_1 \cdot \Delta u \quad (4)$$

If the observation does not contain any estimate errors, $\hat{u}_4$ corresponds exactly to the imbalance u to be estimated. In practice, the linear model (1) applies only approximately, so that it may be advantageous to carry out a number of adaptation steps, possibly with successive, increasingly small values $\Delta u$. Moreover, the estimation accuracy is limited by additive disruptive influences. However, these can be kept low by virtue of a sufficiently long measurement time.

Hereinbelow, a description will be given of the calibration of the carrier suppression by means of level indicator 4 using the method according to the invention.

If a rotating exponential function is transmitted with the frequency $f_0$, $s(t)=s_I(t)+j\cdot s_Q(t)=A_0\cdot\exp(j2\pi f_0 t+\phi_0)$ where $f_0\ll f_C$, in the case of perfect balancing a constant voltage $p(t)=K_0$ appears at the output of the level indicator 4. An imbalanced DC voltage component $E\neq D$ then gives rise, at the output of the level indicator 4, to an approximately sinusoidal oscillation with the frequency $f_0$, $p(t)=K_1+L_1\sin(2\pi f_0 t+\phi_1)$.

The amplitude $L_1$ and phase $\phi_1$ of this sinusoidal oscillation contain information about the imbalance of the DC voltage component in the I and Q direction, but the effect of the imbalance is a priori not known. This is therefore estimated as the matrix B, cf. (3). This matrix implicitly contains information about the delay between signal generation and signal recording and also the transmission characteristic of the level indicator 4. The observation vector v is obtained as the scalar product over a whole number of received sine periods from p(t) using a corresponding part of a rotating exponential function of frequency $f_0$, $w(t)=\exp(j2\pi f_0 t)=w_I(t)+jw_Q(t)$, in a real part and an imaginary part. It is important here that the delay between the transmitted signal and the observed signal is constant in all three measurements of an adaptation step.

The calculation steps for an adaptation step are described below. Here, calculation steps (3) and (4) from the previous section are combined for the sake of simplicity, that is to say the matrix B is not calculated explicitly:

1) Transmit s(t) using the DC compensation values $D_{I,1}$, $D_{Q,1}$. Using the output signal of the level indicator, determine:

$$v_{I,1}:=\int_0^{NT_0}p_1(t)\cdot w_I(t)\cdot dt \text{ and } v_{Q,1}:=\int_0^{NT_0}p_1(t)\cdot w_Q(t)\cdot dt.$$

2) Transmit s(t) using modified compensation values $D_{I,2}$, $D_{Q,2}$, for example using $D_{I,2}=D_{I,1}+\Delta D$, $D_{Q,2}=D_{Q,1}$. Using the output signal of the level indicator, determine:

$$v_{I,2}:=\int_0^{NT_0}p_2(t)\cdot w_I(t)\cdot dt \text{ and } v_{Q,2}:=\int_0^{NT_0}p_2(t)\cdot w_Q(t)\cdot dt.$$

3) Transmit s(t) using further modified compensation values, for example using $D_{I,3}=D_{I,1}$, $D_{Q,3}=D_{Q,1}+\Delta D$. Using the output signal of the level indicator, determine:

$$v_{I,3}:=\int_0^{NT_0}p_3(t)\cdot w_I(t)\cdot dt \text{ and } v_{Q,3}:=\int_0^{NT_0}p_3(t)\cdot w_Q(t)\cdot dt.$$

4) Calculate $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$, and $R:=1/(z_1+z_2+z_3)$ and, from this, improved DC compensation values $D_I=(D_{I,1}\cdot z_1+D_{I,2}\cdot z_2+D_{I,3}\cdot z_3)\cdot R$ and $D_Q=(D_{Q,1}\cdot z_1+D_{Q,2}\cdot z_2+D_{Q,3}\cdot z_3)\cdot R$.

Hereinbelow, a description will be given of the calibration of the sideband suppression by means of level indicator 4 using the method according to the invention.

If a rotating exponential function is transmitted with the frequency $f_0$, $s(t)=A_0\cdot\exp(j2\pi f_0 t+\phi_0)$ where $f_0\ll f_C$, in the case of perfect balancing a constant voltage $p(t)=K_0$ appears at the output of the level indicator 4. An imbalance of the amplification in the I and Q paths or an imbalance of the ideal 90-degree phase shift of the oscillator signals for I and Q then gives rise, at the output of the level indicator 4, to an approximately sinusoidal oscillation with the frequency $2f_0$, $p(t)=K_2+L_2\sin(4\pi f_0 t+\phi_2)$.

The amplitude $L_2$ and phase $\phi_2$ of this sinusoidal oscillation contain information about the imbalance of amplitude and phase position in the I and Q direction, but the effect of the imbalance is a priori not known. This is therefore estimated as the matrix B in accordance with (3). This matrix implicitly contains information about the delay between signal generation and signal recording and also the transmission characteristic of the level indicator 4. The observation vector v is obtained as the scalar product over a whole number of received sine periods from p(t) using the corresponding part of a rotating exponential function of frequency $2\cdot f_0$, $w(t)=\exp(j4\pi f_0 t)=w_I(t)+jw_Q(t)$, in a real part and an imaginary part. It is important here that the delay between the transmitted signal and the observed signal is constant in all three measurements of an adaptation step.

The calculation steps for an adaptation step are described below. Here, calculation steps (3) and (4) from the previous section are combined for the sake of simplicity, that is to say the matrix B is not calculated explicitly:

1) Transmit s(t) using the I/Q compensation values $C_{I,1}$, $C_{Q,1}$. Using the output signal of the level indicator, determine $$v_{I,1}:=\int_0^{NT_0}p_1(t)\cdot w_I(t)\cdot dt \text{ and } v_{Q,1}:=\int_0^{NT_0}p_1(t)\cdot w_Q(t)\cdot dt.$$

2) Transmit s(t) using modified compensation values, for example using $C_{I,2}=C_{I,1}+\Delta C$, $C_{Q,2}=C_{Q,1}$. Using the output signal of the level indicator, determine:

$$v_{I,2}:=\int_0^{NT_0}p_2(t)\cdot w_I(t)\cdot dt \text{ and } v_{Q,2}:=\int_0^{NT_0}p_2(t)\cdot w_Q(t)\cdot dt.$$

3) Transmit s(t) using further modified I/Q compensation values, for example using $C_{I,3}=C_{I,1}$, $C_{Q,3}=C_{Q,1}+\Delta C$. Using the output signal of the level indicator, determine:

$$v_{I,3}:=\int_0^{NT_0}p_3(t)\cdot w_I(t)\cdot dt \text{ and } v_{Q,3}:=\int_0^{NT_0}p_3(t)\cdot w_Q(t)\cdot dt.$$

4) Calculate $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$, and $R:=1/(z_1+z_2+z_3)$ and, from this, improved I/Q compensation values $C_I=(C_{I,1}\cdot z_1+C_{I,2}\cdot z_2+C_{I,3}\cdot z_3)\cdot R$ and $C_Q=(C_{Q,1}\cdot z_1+C_{Q,2}\cdot z_2+C_{Q,3}\cdot z_3)\cdot R$.

Hereinbelow, a description will be given of the calibration of the carrier suppression by means of I/Q demodulator 8 using the method according to the invention.

Figure 3:
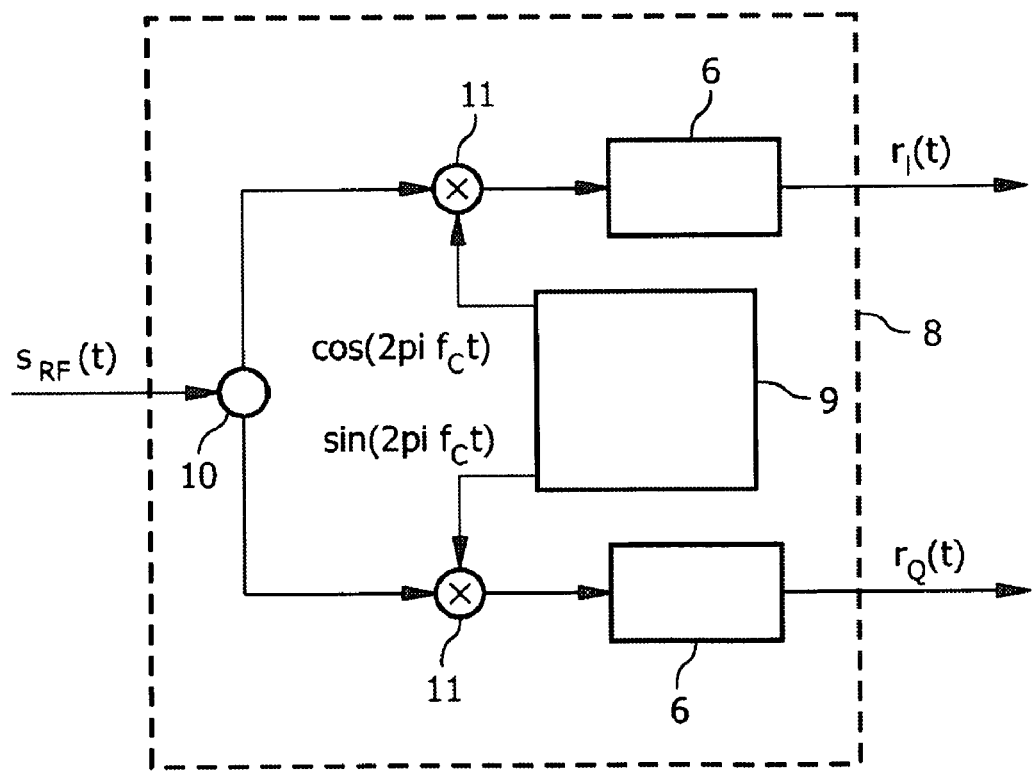
FIG. 3 shows an I/Q demodulator.

An appropriate I/Q demodulator arrangement 8 is shown in FIG. 3. Such an arrangement 8 consists of the input node 10, which is connected to the input, two multipliers 11 connected to the input node 10, an I/Q oscillator 9, which is also used in the I/Q modulator arrangement 1 in FIG. 1, and one low-pass filter per path.

If a rotating exponential function is transmitted with the frequency $f_0$, $s(t)=s_I(t)+j\cdot s_Q(t)=A_0\cdot\exp(j2\pi f_0 t+\phi_0)$ where $f_0 \ll f_C$, in the case of perfect balancing a DC-free rotating exponential function appears at the output of the I/Q demodulator 8. An imbalanced DC voltage component $E \neq D$ then gives rise, at the output of the I/Q demodulator 8, to a rotating exponential function with an additive constant voltage component, $r(t)=r_I(t)+j\cdot r_Q(t)=L_3\cdot\exp(j\cdot\phi_3)+L_4\cdot\exp(j2\pi f_0 t+\phi_4)$.

The amplitude $L_3$ and phase $\phi_3$ of the constant component contain information about the imbalance of the DC voltage component in the I and Q direction, but the effect of the imbalance is a priori not known. This is therefore estimated as the matrix B in accordance with (3). This matrix implicitly contains information about the delay between signal generation and signal recording and also the transmission characteristic of the level indicator 4. The observation vector v is obtained as the integral over a whole number of received sine/cosine periods from r(t), in a real part and an imaginary part. It is likewise necessary here that the delay between the transmitted signal and the observed signal is constant in all three measurements of an adaptation step.

The calculation steps for an adaptation step are described below. Here, calculation steps (3) and (4) from the previous section are combined for the sake of simplicity, that is to say the matrix B is not calculated explicitly:

1) Transmit s(t) using the DC compensation values $D_{I,1}$, $D_{Q,1}$. Using the output signal of the I/Q demodulator, determine:

$$v_{I,1} := \int_0^{NT_0} r_{I,1}(t)\cdot dt \quad \text{and} \quad v_{Q,1} := \int_0^{NT_0} r_{Q,1}(t)\cdot dt.$$

2) Transmit s(t) using modified compensation values, for example using $D_{I,2}=D_{I,1}+\Delta D$, $D_{Q,2}=D_{Q,1}$. Using the output signal of the I/Q demodulator, determine:

$$v_{I,2} := \int_0^{NT_0} r_{I,2}(t)\cdot dt \quad \text{and} \quad v_{Q,2} := \int_0^{NT_0} r_{Q,2}(t)\cdot dt.$$

3) Transmit s(t) using further modified compensation values, for example using $D_{I,3}=D_{I,1}$, $D_{Q,3}=D_{Q,1}+\Delta D$. Using the output signal of the I/Q demodulator, determine:

$$v_{I,3} := \int_0^{NT_0} r_{I,3}(t)\cdot dt \quad \text{and} \quad v_{Q,3} := \int_0^{NT_0} r_{Q,3}(t)\cdot dt.$$

4) Calculate $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$, and $R:=1/(z_1+z_2+z_3)$ and, from this, improved DC compensation values $D_I=(D_{I,1}\cdot z_1+D_{I,2}\cdot z_2+D_{I,3}\cdot z_3)\cdot R$ and $D_Q=(D_{Q,1}\cdot z_1+D_{Q,2}\cdot z_2+D_{Q,3}\cdot z_3)\cdot R$.

Hereinbelow, a description will be given of the calibration of the sideband suppression by means of I/Q demodulator 8 using the method according to the invention.

If a rotating exponential function is transmitted with the frequency $f_0$, $s(t)=A_0\cdot\exp(j2\pi f_0 t+\phi_0)$ where $f_0 \ll f_C$, in the case of perfect balancing a rotating exponential function appears at the output of the I/Q modulator 8. An imbalance of the amplification in the I and Q paths or an imbalance of the ideal 90-degree phase shift of the oscillator signals for I and Q then gives rise, at the output of the I/Q demodulator 8, to an elliptically distorted or unevenly rotating exponential function.

The distortion of this oscillation contains information about the imbalance of amplitude and phase position in the I and Q direction, but the effect of the imbalance is a priori not known. This is therefore estimated as the matrix B in accordance with (3). This matrix implicitly contains information about the delay between signal generation and signal recording and also the transmission characteristic of the I/Q demodulator 8. The observation vector v is obtained as the scalar product over a whole number of received sine periods from r(t) using the corresponding part of a rotating exponential function of frequency $f_0$, $w(t)=\exp(-j2\pi f_0 t)=w_I(t)+jw_Q(t)$, in a real part and an imaginary part. It is also important here that the delay between transmitted signal and observed signal is constant in all three measurements of an adaptation step.

The calculation steps for an adaptation step are described below. Here, calculation steps (3) and (4) from the previous section are combined for the sake of simplicity, that is to say the matrix B is not calculated explicitly:

1) Transmit s(t) using the I/Q compensation values $C_{I,1}$, $C_{Q,1}$. Using the output signal of the I/Q demodulator, determine:

$$v_{I,1} := \int_0^{NT_0} r_{I,1}(t)\cdot w_I(t) + r_Q(t)\cdot w_Q(t)\cdot dt$$

and $$v_{Q,1} := \int_0^{NT_0} r_{Q,1}(t)\cdot w_I(t) - r_I(t)\cdot w_Q(t)\cdot dt.$$

2) Transmit s(t) using modified compensation values, for example using $C_{I,2}=C_{I,1}+\Delta C$, $C_{Q,2}=C_{Q,1}$. Using the output signal of the I/Q demodulator, determine:

$$v_{I,2} := \int_0^{NT_0} r_{I,2}(t)\cdot w_I(t) + r_Q(t)\cdot w_Q(t)\cdot dt$$

and $$v_{Q,2} := \int_0^{NT_0} r_{Q,2}(t)\cdot w_I(t) - r_I(t)\cdot w_Q(t)\cdot dt.$$

3) Transmit s(t) using further modified compensation values, for example using $C_{I,3}=C_{I,1}$, $C_{Q,3}=C_{Q,1}+\Delta C$. Using the output signal of the I/Q demodulator, determine:

$$v_{I,3} := \int_0^{NT_0} r_{I,3}(t)\cdot w_I(t) + r_Q(t)\cdot w_Q(t)\cdot dt$$

and $$v_{Q,3} := \int_0^{NT_0} r_{Q,3}(t)\cdot w_I(t) - r_I(t)\cdot w_Q(t)\cdot dt.$$

4) Calculate $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$, and $R:=1/(z_1+z_2+z_3)$ and, from this, improved I/Q compensation values $C_I=(C_{I,1}\cdot z_1+C_{I,2}\cdot z_2+C_{I,3}\cdot z_3)\cdot R$ and $C_Q=(C_{Q,1}\cdot z_1+C_{Q,2}\cdot z_2+C_{Q,3}\cdot z_3)\cdot R$.

If the sideband suppression is calibrated using constant compensation coefficients 3 for $D_I$ and $D_Q$ for all three measurements and partial compensation coefficients 3 of $C_I$ and $C_Q$ which change by a change value $\Delta C$ in accordance with $(C_{I,1}, C_{Q,1})$ for the first method step, $(C_{I,1}+\Delta C, C_{Q,1})$ for the second method step and $(C_{I,1}, C_{Q,1}+\Delta C)$ for the third method step, the calculation in step 4) is simplified in accordance with $C_I=C_{I,1}+\Delta C \cdot z_2 \cdot R$ and $C_Q=C_{Q,1}+\Delta C \cdot z_3 \cdot R$.

If the carrier suppression is calibrated using constant compensation coefficients 3 for $C_I$ and $C_Q$ for all three measurements and partial compensation coefficients 3 of $D_I$ and $D_Q$ which change by a change value $\Delta D$ in accordance with $(D_{I,1}, D_{Q,1})$ for the first method step, $(D_{I,1}+\Delta D, D_{Q,1})$ for the second method step and $(D_{I,1}, D_{Q,1}+\Delta D)$ for the third method step, the calculation in step 4) is simplified in accordance with $D_I=D_{I,1}+\Delta D \cdot z_2 \cdot R$ and $D_Q=D_{Q,1}+\Delta D \cdot z_3 \cdot R$.

Using the method according to the invention, the following advantages are obtained:

The method is robust and insensitive to:
DC offset of the transmission characteristic of the level indicator
Temperature-dependence of the transmission characteristic of the level indicator
Variation in the propagation time between transmission signal and signal on the level indicator
Phase rotation of the signal at the I/Q demodulator output
Propagation time between I/Q modulator and I/Q demodulator
Lower calculation complexity
Calibration takes place at a selectable signal level=>optimal calibration results for desired operating level (calibration may be level-dependent on account of nonlinearities)
Calibration does not take place at DC but rather at a selectable frequency=>method can be used for frequency-dependent calibration, which is beneficial for example in the case of orthogonal frequency division multiplexing (OFDM) as transmission signal
Both paths of the I/Q modulator are controlled during the calibration=>possible nonlinear interactions occur to a degree as in normal operation=>high calibration accuracy
Simultaneous calibration of DC offset and I/Q imbalance is possible=>short calibration time
Calibration operation restricted to dedicated calibration time=>low power requirement for calibration (compared to the method with a continuous update)

REFERENCES

1 I/Q modulator
2 compensation circuit
3 compensation coefficients
4 level indicator arrangement envelope curve detector
6 low-pass filter
7 stage with nonlinear transmission behavior
8 I/Q demodulator
9 quadrature phase oscillator
10 input node
11 multiplier
12 output signal

REFERENCES/DEFINITIONS

DC compensation values: $D_I$, $D_Q$
shift in compensation: $\Delta D$
complex baseband transmission signal: $s(t)=\hat{s} \cdot \exp(-j2\pi f_0 t)$
period duration of the test tone: $T_0=1/f_0$
number of periods: N
real-value level indicator output signal: p(t)
test signals for $D_I$, $D_Q$ determination: $w_I(t)=\cos(2\pi f_0 t)$ and $w_Q(t)=\sin(2\pi f_0 t)$
I/Q compensation values: $C_I$, $C_Q$
shift in compensation: $\Delta C$
test signals for $C_I$, $C_Q$ determination: $w_I(t)=\cos(4\pi f_0 t)$ and $w_Q(t)=\sin(4f_0 t)$
complex baseband received signal: $r(t)=r_I(t)+j \cdot r_Q(t)$

The invention claimed is:

1. A method of calibrating an analog I/Q modulator in a high-frequency transmitter, in which an input signal is weighted in an in-phase path and in a quadrature phase path by respectively a first and a second compensation coefficient prior to the I/Q modulation, and an output signal is produced, comprising:

in a first method step, providing the high-frequency transmitter in a second method step, the first compensation coefficients $C_I$, $C_Q$ (3), which affect the sideband suppression of the output signal, and the second compensation coefficients $D_I$, $D_Q$ (3), which affect the carrier suppression of the output signal (12), are in each case set to a first predefined value $C_{I,1}$, $C_{Q,1}$, $D_{I,1}$ and $D_{Q,1}$, in that the input of the I/Q modulator (1) is supplied with an input signal which satisfies a rotating exponential function with the frequency $f_0$, a first I/Q modulator output signal (12) is produced and fed to a first evaluation and the result of the first evaluation is stored, in that, in a third method step, the first and second compensation coefficients (3) are in each case set to a second defined value $C_{I,2}$, $D_{I,2}$ and $D_{Q,2}$ and a second I/Q modulator output signal (12) is produced, fed to a second evaluation and the result of the second evaluation is stored, in that, in a fourth method step, the first and second compensation coefficients (3) are in each case set to a third defined value $C_{I,3}$, $D_{I,3}$ and $D_{Q,3}$ and a third I/Q modulator output signal (12) is produced, fed to a third evaluation and the result of the third evaluation is stored, in that, in a fifth method step, improved compensation coefficients (3) which reduce at least one of an amplitude, a phase imbalance of the I/Q modulator (1) and an amplitude of the residual carrier are calculated for the first and second compensation coefficients (3) from the results stored in the second, third and fourth method steps, and wherein the second, third, fourth and fifth method steps are repeated using these improved compensation coefficients (3) until at least one of the error of the amplitude and a phase response of the I/Q modulator (1) lies below a defined threshold value or a defined number of run-throughs of the method is reached.

2. A method as claimed in claim 1, characterized in that the first compensation coefficients (3) $C_I$, $C_Q$ or the second compensation coefficients (3) $D_I$, $D_Q$ have the same value for the second, third and fourth method step.

3. A method as claimed in claim 1, characterized in that, for the second method step, at least one of the first compensation coefficients (3) $C_I$, $C_Q$ and the second compensation coefficients (3) $D_I$, $D_Q$ are set to compensation coefficients (3) determined in a previous run-through of the method.

4. A method as claimed in claim 1, characterized in that at least one of the compensation coefficients (3) $C_I$, $C_Q$, $D_I$, $D_Q$ is acted upon by at least one of a change value $\Delta C$ and $\Delta D$ prior to a subsequent method step.

5. A method as claimed in claim 1, characterized in that the input signal fed in at the input of the I/Q modulator (1), which satisfies a rotating exponential function with the frequency $f_0$, is produced from a partial function $S_I(t)=A_0*\cos(2\pi f_0 t+\phi_0)$ for the in-phase input and a partial function $s_Q(t)=A_0*\sin(2\pi f_0 t+\phi_0)$ for the quadrature phase input.

6. A method as claimed in claim 1, characterized in that the I/Q modulator output signal (12) is subjected to power detec tion and thus a level indicator output signal p(t) is produced, in that the first evaluation takes place in accordance with $$v_{I,1} := \int_0^{NT_0} p_1(t) \cdot w_I(t) \cdot dt \text{ and } v_{Q,1} := \int_0^{NT_0} p_1(t) \cdot w_Q(t) \cdot dt,$$

wherein, in order to determine improved first compensation coefficients (3) $C_I$ and $C_Q$, $w_I(t)=\cos(4\pi f_0 t)$ and $w_Q(t)=\sin(4\pi f_0 t)$, in that the second evaluation takes place in accordance with $$v_{I,2} := \int_0^{NT_0} p_2(t) \cdot w_I(t) \cdot dt \text{ and } v_{Q,2} := \int_0^{NT_0} p_2(t) \cdot w_Q(t) \cdot dt,$$

in that the third evaluation takes place in accordance with $$v_{I,3} := \int_0^{NT_0} p_3(t) \cdot w_I(t) \cdot dt \text{ and } v_{Q,3} := \int_0^{NT_0} p_3(t) \cdot w_Q(t) \cdot dt,$$

in that the determination of the improved first compensation coefficients (3) $C_I$ and $C_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $C_I=(C_{I,1} \cdot z_1+C_{I,2} \cdot z_2+C_{I,3} \cdot z_3) \cdot R$ and $C_Q=(C_{Q,1} \cdot z_1+C_{Q,2} \cdot z_2+C_{Q,3} \cdot z_3) \cdot R$ or the determination of the improved second compensation coefficients (3) $D_I$ and $D_Q$, wherein $w_I(t)=\cos(2\pi f_0 t)$ and $w_Q(t)=\sin(2\pi f_0 t)$, is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $D_I=(D_{I,1} \cdot z_1+D_{I,2} \cdot z_2+D_{I,3} \cdot z_3) \cdot R$ and $D_Q=(D_{Q,1} \cdot z_1+D_{Q,2} \cdot z_2+D_{Q,3} \cdot z_3) \cdot R$.

7. A method as claimed in claim 1, characterized in that the I/Q modulator output signal (12) is subjected to an I/Q demodulation and thus a complex baseband received signal $r(t)=r_I(t)+r_Q(t)$ is produced, in that the first evaluation takes place in accordance with $$v_{I,1} := \int_0^{NT_0} r_{I,1}(t) \cdot dt \text{ and } v_{Q,1} := \int_0^{NT_0} r_{Q,1}(t) \cdot dt,$$

in that the second evaluation takes place in accordance with $$v_{I,2} := \int_0^{NT_0} r_{I,2}(t) \cdot dt \text{ and } v_{Q,2} := \int_0^{NT_0} r_{Q,2}(t) \cdot dt,$$

in that the third evaluation takes place in accordance with $$v_{I,3} := \int_0^{NT_0} r_{I,3}(t) \cdot dt \text{ and } v_{Q,3} := \int_0^{NT_0} r_{Q,3}(t) \cdot dt,$$

in that the determination of the improved second compensation coefficients (3) $D_I$ and $D_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $D_I=(D_{I,1} \cdot z_1+D_{I,2} \cdot z_2+D_{I,3} \cdot z_3) \cdot R$ and $D_Q=(D_{Q,1} \cdot z_1+D_{Q,2} \cdot z_2+D_{Q,3} \cdot z_3) \cdot R$ or the first evaluation takes place in accordance with $$v_{I,1} := \int_0^{NT_0} r_{I,1}(t) \cdot w_I(t) + r_{Q1}(t) \cdot w_Q(t) \cdot dt$$

and $$v_{Q,1} := \int_0^{NT_0} r_{Q,1}(t) \cdot w_I(t) - r_{I1}(t) \cdot w_Q(t) \cdot dt,$$

in that the second evaluation takes place in accordance with $$v_{I,2} := \int_0^{NT_0} r_{I,2}(t) \cdot w_I(t) + r_{Q2}(t) \cdot w_Q(t) \cdot dt$$

and $$v_{Q,2} := \int_0^{NT_0} r_{Q,2}(t) \cdot w_I(t) - r_{I2}(t) \cdot w_Q(t) \cdot dt,$$

in that the third evaluation takes place in accordance with $$v_{I,3} := \int_0^{NT_0} r_{I,3}(t) \cdot w_I(t) + r_{Q3}(t) \cdot w_Q(t) \cdot dt$$

and $$v_{Q,3} := \int_0^{NT_0} r_{Q,3}(t) \cdot w_I(t) - r_{I3}(t) \cdot w_Q(t) \cdot dt,$$

in that the determination of the improved first compensation coefficients (3) $C_I$ and $C_Q$ is carried out in accordance with $z_1:=v_{Q,3}v_{I,2}-v_{I,3}v_{Q,2}$, $z_2:=v_{I,3}v_{Q,1}-v_{Q,3}v_{I,1}$, $z_3:=v_{Q,2}v_{I,1}-v_{I,2}v_{Q,1}$ and $R:=1/(z_1+z_2+z_3)$ and also $C_I=(C_{I,1} \cdot z_1+C_{I,2} \cdot z_2+C_{I,3} \cdot z_3) \cdot R$ and $C_Q=(C_{Q,1} \cdot z_1+C_{Q,2} \cdot z_2+C_{Q,3} \cdot z_3) \cdot R$.

8. A method as claimed in either of claims 6 and 7, characterized in that the integrations used in the method take place in a time-discrete manner such that sampling of the function variation takes place with a subsequent summation.

9. A method as claimed in claim 1, characterized in that the method takes place during start-up of the high-frequency transmitter, in a time-controlled manner, in the event of changing ambient conditions such as at least one of pressure and temperature and in an event of a change in operating mode of the high-frequency transmitter.

* * * * *